United States Patent
Houck et al.

(10) Patent No.: US 8,533,743 B2
(45) Date of Patent: Sep. 10, 2013

(54) SYSTEM AND METHOD OF ANALYZING BUSINESS PROCESS EVENTS

(75) Inventors: Christopher Raymond Houck, Dallas, TX (US); Edward M. Peters, Dallas, TX (US); Stuart H. Burris, Jr., Garland, TX (US); Eric P. Armstrong, McKinney, TX (US)

(73) Assignee: Openconnect Systems Incorporated, Dallas, TX (US)

( * ) Notice: Subject to any disclaimer, the term of this patent is extended or adjusted under 35 U.S.C. 154(b) by 321 days.

(21) Appl. No.: 12/827,793

(22) Filed: Jun. 30, 2010

(65) Prior Publication Data

US 2012/0005690 A1    Jan. 5, 2012

(51) Int. Cl.
*G06F 9/54*       (2006.01)
*G06F 17/00*   (2006.01)

(52) U.S. Cl.
USPC .......................................... 719/318; 715/230

(58) Field of Classification Search
USPC ......................................................... 719/318
See application file for complete search history.

(56) References Cited

U.S. PATENT DOCUMENTS

| | | | |
|---|---|---|---|
| 2005/0171833 A1* | 8/2005 | Jost et al. ......................... | 705/10 |
| 2009/0262131 A1* | 10/2009 | Suntinger et al. ............. | 345/619 |
| 2009/0319472 A1* | 12/2009 | Jain et al. .......................... | 707/2 |
| 2009/0319482 A1* | 12/2009 | Norlander et al. ................ | 707/3 |

\* cited by examiner

*Primary Examiner* — Andy Ho
*Assistant Examiner* — Abdou Seye
(74) *Attorney, Agent, or Firm* — Baker Botts L.L.P.

(57) ABSTRACT

A method includes receiving a plurality of events that each include a plurality of associated attributes, analyzing the plurality of associated attributes in order to identify at least two or more related events, determining a time associated with each of the at least two or more related events from the plurality of associated attributes, ordering the at least two or more related events in chronological order based on the determined time associated with each of the at least two or more related events, and manipulating at least one of the at least two or more related events based on the ordering.

18 Claims, 3 Drawing Sheets

SYSTEM AND METHOD OF ANALYZING BUSINESS PROCESS EVENTS

TECHNICAL FIELD

This invention relates generally to the field of data analysis and more specifically to system and method of analyzing business process events.

BACKGROUND

Businesses and corporations typically utilize various systems and processes to execute routine business operations. For example, systems such as web servers and interactive voice-response systems may be utilized to provide services to customers. Systems and processes utilized by businesses and corporations may generate data based on business process events occurring in routine business operations.

SUMMARY OF THE DISCLOSURE

In accordance with the present invention, disadvantages and problems associated with previous techniques for analyzing business process events may be reduced or eliminated.

According to one embodiment of the present invention, a method includes receiving a plurality of events that each include a plurality of associated attributes, analyzing the plurality of associated attributes in order to identify at least two or more related events, determining a time associated with each of the at least two or more related events from the plurality of associated attributes, ordering the at least two or more related events in chronological order based on the determined time associated with each of the at least two or more related events, and manipulating at least one of the at least two or more related events based on the ordering.

Certain embodiments of the invention may provide one or more technical advantages. A technical advantage of one embodiment may be that business process events may be analyzed in order to reconstruct the business process. Another technical advantage of one embodiment may be that business process events may be time-ordered and augmented with data in order to determine whether a particular enterprise system or process is adequately performing. Some embodiments may provide advantages by analyzing business process events that have no pre-defined schema and have unique sets of attributes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
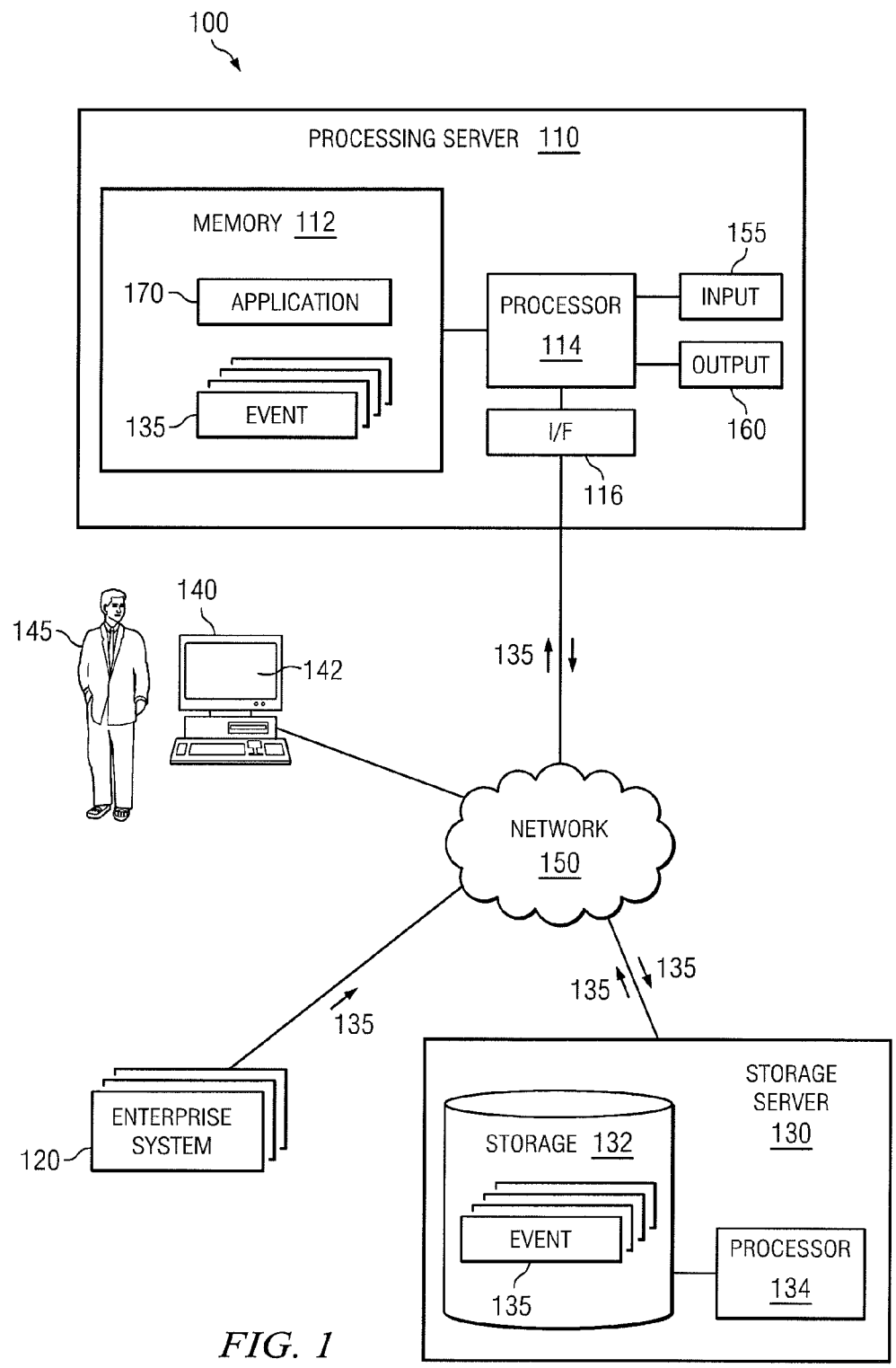
FIG. 1 illustrates a system for analyzing business process events, according to certain embodiments.
Figure 2:
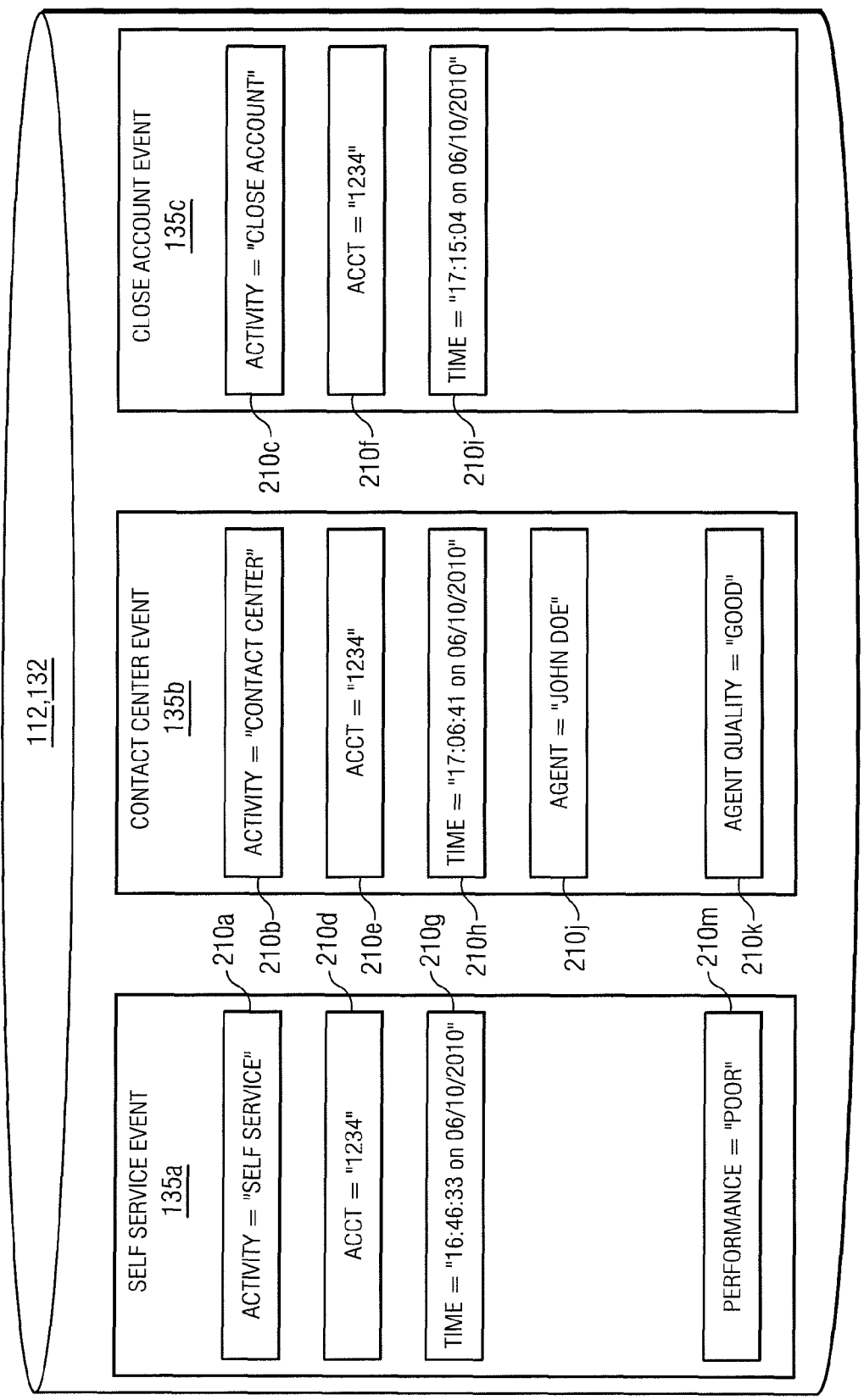
FIG. 2 illustrates business process events that may be analyzed by the system of FIG. 1, according to certain embodiments.
Figure 3:
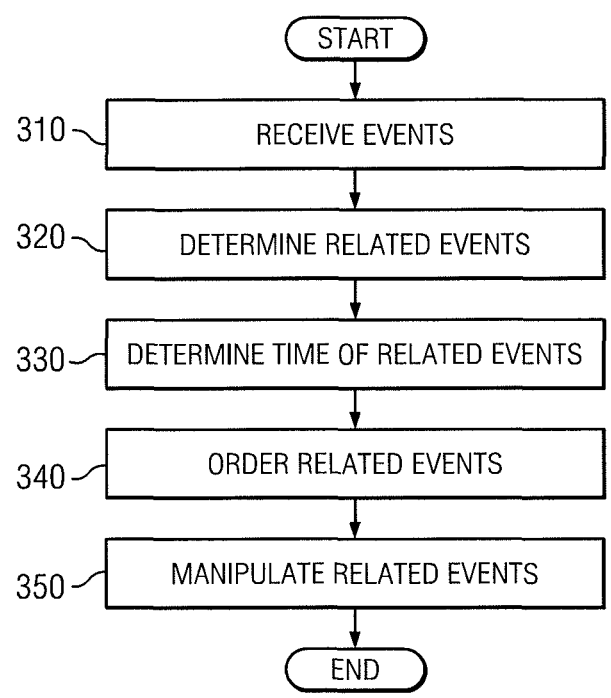
FIG. 3 illustrates a method for analyzing business process events, according to certain embodiments.

Embodiments of the present invention and its advantages are best understood by referring to FIGS. 1 through 3 of the drawings, like numerals being used for like and corresponding parts of the various drawings.

Businesses and corporations typically utilize computer processes and enterprise systems in routine business operations. Examples of systems utilized for business operations may include various computer systems, web servers, call centers, and interactive voice-response systems. For example, a business may utilize a web server that enables a customer to perform self-service operations such as changing a mailing address and/or a contact phone number. As another example, a business may operate a call center where employees field calls from customers and utilize computer systems to assist the customer with tasks such as managing the customer's account, taking and/or managing orders from the customer for the business's products, and/or any other task related to business operations.

Enterprise systems and computer processes utilized in business operations may generate digital data for events occurring in business operations. However, data generated in response to such events may be voluminous and therefore businesses and corporations are not able to easily determine a correlation between events occurring at different times on the systems. As a result, businesses and corporations are not able to easily reconstruct the business process and determine whether a particular enterprise system or process is meeting their needs.

The teachings of the disclosure recognize that it would be desirable to provide a system and method that analyzes and correlates business process events in order to provide a reconstruction of business processes. FIGS. 1 through 3 below illustrate a system and method of analyzing business process events according to the teachings of the disclosure.

FIG. 1 illustrates a system 100 according to certain embodiments. System 100 includes a processing server 110, one or more enterprise systems 120, a storage server 130, a client 140, and a user 145. Processing server 110, enterprise systems 120, storage server 130, and client 140 may be communicatively coupled by a network 150. Processing server 110 is generally operable to analyze and manipulate one or more business process events 135 (hereinafter "events"), as described below.

In general, processing server 110 analyzes and manipulates one or more events 135. First, events 135 corresponding to a business activity may be generated by one or more enterprise systems 120 and/or any business process. Events 135 may then be transmitted to storage server 130 and/or processing server 110. Processing server 110 may then analyze and manipulate events 135 in order to provide a reconstruction of a business process. In some embodiments, processing server 110 may additionally augment existing data of events 135 with new data according to the analysis of events 135.

In general, events 135 are digital data regarding any activity that occurred in the business process. As described above, events 135 may be generated by enterprise systems 120 or any other process utilized in business operations. Each event 135 may include one or more attributes (such as attributes 210a-210j described below in reference to FIG. 2.) In some embodiments, events 135 do not have a pre-defined schema, and each event 135 may have a unique set of attributes. In some embodiments, the attributes of events 135 are not pre-defined, but rather each source of events 135 generates the attributes of events 135 according to the particular event that occurred in the business process. In some embodiments, each event 135 includes at least two attributes: a time attribute and an activity attribute. In some embodiments, events 135 may be the event records as described in, and may be obtained as described in, pending U.S. application Ser. No. 11/775,609 entitled "System and Method for Modeling Business Processes" filed Jul. 10, 2007, which is incorporated by reference herein.

In some embodiments, events 135 are Extensible Markup Language (XML) documents. For example, in some embodiments events 135 are electronic data interchange (EDI) documents such as an 837 claims submission document. Other examples of events 135 are described in more detail below in reference to FIG. 2.

In some embodiments, processing server 110 may refer to any suitable combination of hardware and/or software implemented in one or more modules to process data and provide the described functions and operations. In some embodiments, the functions and operations described herein may be performed by a pool of processing servers 110. In some embodiments, processing server 110 includes, for example, a mainframe, server, host computer, workstation, web server, file server, a personal computer such as a laptop, or any other suitable device operable to process data. In some embodiments, processing server 110 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In some embodiments, processing server 110 may include a processor 114, memory 112, a communication interface 116, an input 155, and an output 160. Memory 112 may refer to any suitable device capable of storing and facilitating retrieval of data and/or instructions.

Examples of memory 112 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile computer-readable memory devices that store one or more files, lists, tables, or other arrangements of information. Although FIG. 1 illustrates memory 112 as internal to processing server 110, it should be understood that memory 112 may be internal or external to processing server 110, depending on particular implementations. Also, memory 112 may be separate from or integral to other memory devices to achieve any suitable arrangement of memory devices for use in system 100.

Memory 112 is generally operable to store an application 170 and events 135. Application 170 generally refers to logic, rules, algorithms, code, tables, and/or other suitable instructions. Examples of events 135 are described in more detail below in reference to FIG. 2.

Memory 112 is communicatively coupled to processor 114. Processor 114 is generally operable to execute application 170 stored in memory 112 to provide the described functions, methods, and operations. Processor 114 may comprise any suitable combination of hardware and software implemented in one or more modules to execute instructions and manipulate data to perform the described functions for processing server 110. In some embodiments, processor 114 may include, for example, any type of central processing unit (CPU).

In some embodiments, communication interface 116 (I/F) is communicatively coupled to processor 114 and may refer to any suitable device operable to receive input for processing server 110, send output from processing server 110, perform suitable processing of the input or output or both, communicate to other devices, or any combination of the preceding. Communication interface 116 may include appropriate hardware (e.g. modem, network interface card, etc.) and software, including protocol conversion and data processing capabilities, to communicate through network 150 or other communication system that allows processing server 110 to communicate to other devices. Communication interface 116 may include any suitable software operable to access data from various devices such as enterprise systems 120 and/or storage server 130. Communication interface 116 may also include any suitable software operable to transmit data to various devices such as client 140 and/or storage server 130. Communication interface 116 may include one or more ports, conversion software, or both. In general, communication interface 116 receives events 135 from enterprise systems 120 and/or storage server 135. In some embodiments, communication interface 116 transmits modified events 135 to storage server 130.

In some embodiments, input device 155 may refer to any suitable device operable to input, select, and/or manipulate various data and information. Input device 155 may include, for example, a keyboard, mouse, graphics tablet, joystick, light pen, microphone, scanner, or other suitable input device. Output device 160 may refer to any suitable device operable for displaying information to a user. Output device 160 may include, for example, a video display, a printer, a plotter, or other suitable output device.

Client 140 may refer to any device that enables user 145 to interact with processing server 110. In some embodiments, client 140 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Client 140 may also comprise any suitable user interface such as a display 142, microphone, keyboard, or any other appropriate terminal equipment usable by a user 145. It will be understood that system 100 may comprise any number and combination of clients 140. User 145 utilizes client 140 to interact with processing server 110 to view an analysis of events 135, as described below.

In some embodiments, enterprise systems 120 may refer to any system utilized in the business process. Examples of enterprise systems 120 include any suitable computer system, web server, call center system, customer service system, interactive voice-response system, order management system, hospital system, payment system, and the like.

In some embodiments, storage server 130 may refer to any suitable device communicatively coupled to network 150 and capable of storing and facilitating retrieval of data and/or instructions such as events 135. Storage server may include a storage device 132 and a processor 134. Processor 134 may be any suitable processor operable to execute operations of storage server 130 similar to processor 114 described above. Storage device 132 may be any suitable memory or storage device(s) including computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile computer-readable memory devices that store one or more files, lists, tables, or other arrangements of information. Storage server 130 may store any data and/or instructions utilized by processing server 110. In the illustrated embodiment, storage server 130 stores events 135 for use by processing server 110.

In certain embodiments, network 150 may refer to any interconnecting system capable of transmitting audio, video, signals, data, messages, or any combination of the preceding. Network 150 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In operation, application 170, upon execution by processor 114, analyzes and manipulates one or more events 135. For example, application 170 may receive events 135 from enterprise systems 120 and/or storage server 130. Each event 135 has one or more attributes associated with a particular event that occurred in the business process. Application 170 may then analyze the attributes of events 135 in order to identify at least two or more related events 135. Once the two or more related events have been identified, application 170 may then determine a time that the business event associated with event 135 occurred. Application 170 may then time-order the related events 135 in order to create a trace of the related events 135. As used herein, a trace is an event chain—a list of the related events 135 in chronological order.

After the related events 135 have been placed in chronological order, application 170 may then augment the data of each of the related events 135 with new data not native to the system that generated events 135. For example, application 170 may generate and add new attributes to one or more of the related events 135 based on the ordering in order to provide insight into the business process. In some embodiments, application 170 may store the augmented events 135 in memory 112 and/or storage device 132. In some embodiments, application 170 may index the stored events 135 to enable real-time retrieval of events 135. Example embodiments of events 135 and the operation of application 170 are described in more detail below in reference to FIG. 2.

As previously described, application 170 analyzes and manipulates one or more events 135. For example, FIG. 2 illustrates examples of events 135 that may be stored in memory 112 and/or storage device 132. Examples of events 135 may include a self-service event 135a, a contact center event 135b, and a close account event 135c. Each event 135 includes one or more attributes 210. While three specific events 135 are illustrated in FIG. 2, it should be understood that any number and type of events 135 may be stored in memory 112 and/or storage device 132 and analyzed by application 170. Additionally, each event 135 may have any number of attributes 210. Furthermore, events 135 do not have a pre-define schema and therefore each event 135 may have a unique set of attributes 210.

As previously described, events 135 may be generated for any event that occurred in the business process. For example, self-service event 135a may be generated when a customer visits a website and attempts to close his account. In this example, enterprise system 120 would be a web server that detects that the customer logged into his account and attempted to close his account. As a result, self-service event 135a would be generated by the web server to record the self-service event.

As another example, contact center event 135b may be generated when a customer contacts a contact center. In this example, enterprise system 120 would be a computer system in the contact center. The computer system in the contact center detects that the customer contacted the contact center and generates contact center event 135b to record the contact center event.

As yet another example, close account event 135c may be generated when a customer closes his account. In this example, enterprise system 120 would be a computer system in utilized in the business to manage customer accounts. The computer system detects that the customer closed his account and generates close account event 135c to record the close account event.

Attributes 210 refer to any property of event 135 that describes the associated event that occurred in the business process. For example, events 135a-135c include activity attributes 210a-210c, account number attributes 210d-210f, and time attributes 210g-210i. Contact center event 135b additionally includes an agent attribute 210g. Activity attributes 210a-210c indicate the particular event 135 that occurred in the business. For example, activity attribute 210a may be ACTIVITY="SELF SERVICE" to indicate that event 135a describes an event in the business process where a customer attempted to perform a self-service operation on his account. Account number attributes 210d-210f indicate a particular account number associated with the particular event 135 that occurred in the business. For example, account number attribute 210d may be ACCT="1234" to indicate that event 135a describes an event in the business process associated with account number "1234". Time attributes 210g-210i indicate a time the particular event 135 occurred in the business. For example, time attribute 210g may be TIME="16:46:33 on Jun. 10, 2010" to indicate that event 135a describes an event in the business process that occurred on Jun. 10, 2010 at 16:46:33.

In some embodiments, attributes 210 may have type designations to indicate to application 170 the format of attribute 210. For example, the type designation of attributes 210 may indicate that attribute 210 is a string, an integer, a time, a real number, or any other format of attribute 210.

In operation, application 170 analyzes and manipulates events 135a-135c after they have been generated by enterprise systems 120 or any other business process. In the illustrated embodiment, for example, self service event 135a is first generated and stored in memory 112 or storage device 132. As described above, self service event 135a may be generated by a web server when a customer logs into a website and attempts to close his account. To document the business event, the web server generates self service event 135a that includes activity attribute 210a of ACTIVITY="SELF SERVICE," account attribute 210d of ACCT="1234," and time attribute 210g of TIME="16:46:33 ON Jun. 10, 2010."

Next, contact center event 135b is generated and stored in memory 112 or storage device 132. As described above, contact center event 135b may be generated by a computer system when a customer contacts a contact center and speaks with an employee and/or agent to assist him in closing his account. To document the business event, the computer system associated with the contact center generates contact center event 135b that includes activity attribute 210b of ACTIVITY="CONTACT CENTER," account attribute 210e of ACCT="1234," time attribute 210h of TIME="17:06:41 ON Jun. 10, 2010," and an agent attribute 210j of AGENT="JOHN DOE." Agent attribute 210j may be included in contact center event 135b to indicate the employee and/or agent in the contact center who assisted the customer in closing the account.

Next, close account event 135c is generated and stored in memory 112 or storage device 132. As described above, close account event 135c may be generated by a computer system utilized in the business to manage customer accounts when the computer system detects that the customer's account has been closed. To document the business event, the computer system generates close account event 135c that includes activity attribute 210c of ACTIVITY="CLOSE ACCOUNT," account attribute 210f of ACCT="1234," and time attribute 210i of TIME="17:15:04 ON Jun. 10, 2010."

After events 135a-135c have been generated, application 170 may analyze and manipulate events 135a-135c. In one embodiment, application 170 first receives events 135a-135c from memory 112 and/or storage device 132. Application 170 may then analyze events 135a-135c in order to identify at least two or more related events.

For example, application 170 may analyze attributes 210a-210j of events 135a-135c in order to identify at least one attribute in common. In the illustrated embodiment, for example, application may identify events 135a-135c as being related events because each includes an account attribute of ACCT="1234." In other embodiments, however, application 170 may identify certain events 135 as being related events by analyzing other attributes 210 of events 135.

After events 135a-135c have been identified as being related events, application 170 then determines a time associated with each of related events 135a-135c. In the illustrated embodiment, for example, application 170 determines from time attributes 210g-210i of related events 135a-135c that self service event 135a is associated with a business event that occurred on Jun. 10, 2010 at time 16:46:33, contact center event 135b is associated with a business event that occurred on Jun. 10, 2010 at time 17:06:41, and close account event 135c is associated with a business event that occurred on Jun. 10, 2010 at time 17:15:04.

After determining the times that the business events associated with related events 135a-135c occurred, application 170 then orders related events 135a-135c in chronological order based on the determined times of the business events in order to create a trace of the related events 135a-135c. In the illustrated embodiment, for example, the generated trace of related events 135a-135c would be:

1. A self service event for account #1234 occurred on Jun. 10, 2010 at 16:46:33.
2. A contact service event for account #1234 occurred on Jun. 10, 2010 at 17:06:41
3. A close account event for account #1234 occurred on Jun. 10, 2010 at 17:15:04.

In some embodiments, application 170 may additionally determine the time between related events 135. In the illustrated embodiment, for example, application 170 may analyze the generated trace of related events 135a-135c in order to determine the amount of time that elapsed between events one and two (i.e., between self service event 135a and contact center event 135b), and the amount of time that elapsed between events two and three (i.e., between contact center event 135b and close account event 135c). In this example, application 170 may subtract the time indicated by time attribute 210g from the time indicated by time attribute 210h to determine that 00:20:08 elapsed between self service event 135a and contact center event 135b. Application 170 may also subtract the time indicated by time attribute 210h from the time indicated by time attribute 210i to determine that 00:08:23 elapsed between contact center event 135b and close account event 135c.

In some embodiments, application 170 may manipulate related events 135a-135c based on the generated trace of related events 135a-135c. In some embodiments, application 170 may manipulate related events 135a-135c by first creating a new attribute based on the analysis and/or ordering of related events 135a-135c. For example, application 170 may generate an agent quality attribute 210k based on the ordering of related events 135a-135c. In this example, application 170 may analyze the generated trace of related events 135a-135c and determine that there was no subsequent contact center event subsequent to contact center event 135b. As a result, application 170 may generate a quality score for the employee or agent associated with contact center event 135b to indicate that the employee or agent's actions associated with the business event was adequate. In another example, application 170 may use the determined time between contact center event 135b and close account event 135c as described above in generating the quality score for the employee or agent associated with contact center event 135b. In this example, the determined quality score indicates how much time the employee or agent required to close the customer's account.

Once the quality score is generated, application 170 may then record the quality score in agent quality attribute 210k and append agent quality attribute 210k to contact center event 135b. In this manner, application 170 generates an enriched contact center event 135b that includes information not native to the enterprise system 120 or business process that originally generated contact center event 135b.

As another example, application 170 may generate a performance attribute 210m based on analysis and ordering of related events 135a-135c. In this example, application 170 may use the determined time between self service event 135a and contact center event 135b in generating a performance score for the enterprise system 120 or business process associated with self service event 135a. In this example, the determined time between self service event 135a and 135b was determined by application 170 to be 00:20:08. Based on this information, application 170 may determine that the website associated with self service event 135a as describe above did not meet the customer's needs, thereby causing the customer to call into the call center a short time later. As a result, application 170 may generate a performance score to indicate that the enterprise system 120 or business process associated with self service event 135a failed to meet the customer's needs and then record the performance score in performance attribute 210m. Performance attribute 210m may then be appended by application 170 to self service event 135a. In this manner, application 170 generates an enriched self service event 135b that includes information not native to the enterprise system 120 or business process that originally generated self service event 135a.

Modifications, additions, or omissions may be made to the systems and apparatuses disclosed herein without departing from the scope of the invention. The components of the systems and apparatuses may be integrated or separated. For example, storage 132 may be internal or external to storage server 130. Moreover, the operations of the systems and apparatuses may be performed by more, fewer, or other components. For example, the operations of application 170 may be performed by one component, or the operations of application 170 may be performed by more than one component. Additionally, operations of the systems and apparatuses may be performed using any suitable logic comprising software, hardware, and/or other logic. As used in this document, "each" refers to each member of a set or each member of a subset of a set.

FIG. 3 illustrates one embodiment of a method 300 for analyzing business process events such as events 135 described above. Method 300 may be implemented, for example, by application 170 in processing server 110. Method 300 begins in step 310 where a plurality of events are received. Each received event is digital data that includes a plurality of associated attributes. In some embodiments, the received plurality of events are events 135 described above. In certain embodiments, the plurality of associated attributes may refer to attributes 210 described above.

In step 320, the plurality of associated attributes of the plurality of events received in step 310 are analyzed in order to identify at least two or more related events. In some embodiments, the related events have at least one attribute in common. In other embodiments, the related events have an attribute with a specific value or in a specific range.

In step 330, a time associated with the related events determined in step 320 is determined. In some embodiments, the time of each event is determined from the plurality of associated attributes of the plurality of events received in step 310.

In step 340, the at least two or more related events determined in step 320 are ordered in chronological order based on the times determined in step 330.

In step 350, at least one of the at least two or more related events are manipulated based on the ordering of step 340. In some embodiments, the manipulating of step 350 includes creating a new attribute based on the ordering of step 340 and creating one or more enriched events by appending the new attribute to at least one of the related events as described above.

Modifications, additions, or omissions may be made to the methods disclosed herein without departing from the scope of the invention. The methods may include more, fewer, or other steps. For example, method 300 may additionally include indexing the related events.

Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising a processing server, the processing server comprising memory and a processor, the processing server operable to:
    receive a plurality of events, each event comprising digital data and having a plurality of associated attributes;
    analyze the plurality of associated attributes of the plurality of events in order to identify at least two or more related events, the related events having at least one attribute in common;
    determine a time associated with each of the at least two or more related events, the time of each event being determined from the plurality of associated attributes;
    order the at least two or more related events in chronological order based on the determined time associated with each of the at least two or more related events;
    create a new attribute based on the ordering of the at least two or more related events in chronological order; and
    create one or more enriched events by appending the new attribute to at least one of the at least two or more related events.

2. The system of claim 1, the processing server further operable to index the one or more enriched events.

3. The system of claim 1, wherein each of the plurality of events comprises a unique set of associated attributes.

4. The system of claim 1, wherein the plurality of associated attributes of the plurality of events are not generated according to a pre-defined schema.

5. The system of claim 1, wherein the plurality of events comprise Extensible Markup Language (XML) documents.

6. The system of claim 1, wherein the plurality of events comprise Electronic Data Interchange (EDI) documents.

7. The system of claim 1, wherein the plurality of associated attributes of the plurality of events comprise a time attribute and an activity attribute.

8. A computerized method of analyzing events, comprising:
    receiving at a computer system a plurality of events, each event comprising digital data and having a plurality of associated attributes;
    analyzing, by the computer system, the plurality of associated attributes of the plurality of events in order to identify at least two or more related events, the related events having at least one attribute in common;
    determining, by the computer system, a time associated with each of the at least two or more related events, the time of each event being determined from the plurality of associated attributes;
    ordering, by the computer system, the at least two or more related events in chronological order based on the determined time associated with each of the at least two or more related events;
    creating, by the computer system, a new attribute based on the ordering of the at least two or more related events in chronological order; and
    creating one or more enriched events by appending, by the computer system, the new attribute to at least one of the at least two or more related events.

9. The method of claim 8, wherein each of the plurality of events comprises a unique set of associated attributes.

10. The method of claim 8, wherein the plurality of associated attributes of the plurality of events are not generated according to a pre-defined schema.

11. The method of claim 8, wherein the plurality of events comprise Extensible Markup Language (XML) documents.

12. The method of claim 8, wherein the plurality of events comprise Electronic Data Interchange (EDI) documents.

13. The method of claim 8, wherein the plurality of associated attributes of the plurality of events comprise a time attribute and an activity attribute.

14. Logic embedded in a non-transitory computer readable medium and operable when executed by a processor to:
    receive a plurality of events, each event comprising digital data and having a plurality of associated attributes;
    analyze the plurality of associated attributes of the plurality of events in order to identify at least two or more related events, the related events having at least one attribute in common;
    determine a time associated with each of the at least two or more related events, the time of each event being determined from the plurality of associated attributes;
    order the at least two or more related events in chronological order based on the determined time associated with each of the at least two or more related events;
    create a new attribute based on the ordering of the at least two or more related events in chronological order; and
    create one or more enriched events by appending the new attribute to at least one of the at least two or more related events.

15. The logic of claim 14, wherein each of the plurality of events comprises a unique set of associated attributes.

16. The logic of claim 14, wherein the plurality of associated attributes of the plurality of events are not generated according to a pre-defined schema.

17. The logic of claim 14, wherein the plurality of events comprise Extensible Markup Language (XML) documents.

18. The logic of claim 14, wherein the plurality of associated attributes of the plurality of events comprise a time attribute and an activity attribute.

* * * * *